May 31, 1960

J. E. TRACEY ET AL 2,938,995

ADJUSTABLE MACHINE TOOL FIXTURE FOR
WELDING ELECTRODES AND THE LIKE
Filed Nov. 7, 1957

INVENTORS
JOHN E. TRACEY
ELWOOD L. WHEELER
BY K. G. Doub
ATTORNEY

United States Patent Office

2,938,995
Patented May 31, 1960

---

2,938,995

ADJUSTABLE MACHINE TOOL FIXTURE FOR WELDING ELECTRODES AND THE LIKE

John E. Tracey, Reisterstown, and Elwood L. Wheeler, Owings Mills, Md., assignors to Bendix Aviation Corporation, Baltimore, Md., a corporation of Delaware Filed Nov. 7, 1957, Ser. No. 695,111

2 Claims. (Cl. 219—82)

Fabrication of certain components requires a tool fixture or work holder capable of producing a wobble or progressive rolling motion about a center point or area and/or a direct straight-line thrust. A typical example of a progressive rolling motion in a circular path about a center point is where a pair of oppositely-dished diaphragms are connected at their peripheral edges by a resistance weld to form an evacuated and sealed pressure-sensitive aneroid or capsule as in the co-pending application of William J. Hughes et al., Serial No. 608,065 filed September 5, 1956 (common assignee). Here the angle of thrust or attack of one electrode with respect to the other may vary from a given maximum to zero. Thus to ensure against displacement of one diaphragm with respect to the other during fabrication of a capsule or aneroid, the upper electrode may be first moved into welding position in direct alignment with the lower electrode (on which the two diaphragms have been placed in proper mating relation by an operator) to effect a preliminary spot weld, following which a final sealed weld is effected by driving the upper electrode-holder in a cone-shaped path to produce the desired progressive rolling action. Other types of work may require a direct in-line thrust only, while other types may require a progressive rolling or ironing action only.

An object of the instant invention, therefore, is to provide a machine tool fixture which may be quickly, easily and accurately set to cause the tool to attack the work from a given maximum angle over a cone-shaped radius to a zero or in-line thrust.

Another object is to provide a machine tool fixture or holder incorporating a wobble drive assembly adapted to impart a progressive rolling or "walk-around" motion to a member such as a welding electrode or like fabricating tool carried by the holder, and which fixture also incorporates means capable of being quickly, easily and accurately adjusted to vary the angle of attack of such member from a given maximum angle to a zero angle or in-line movement.

Figure 1:
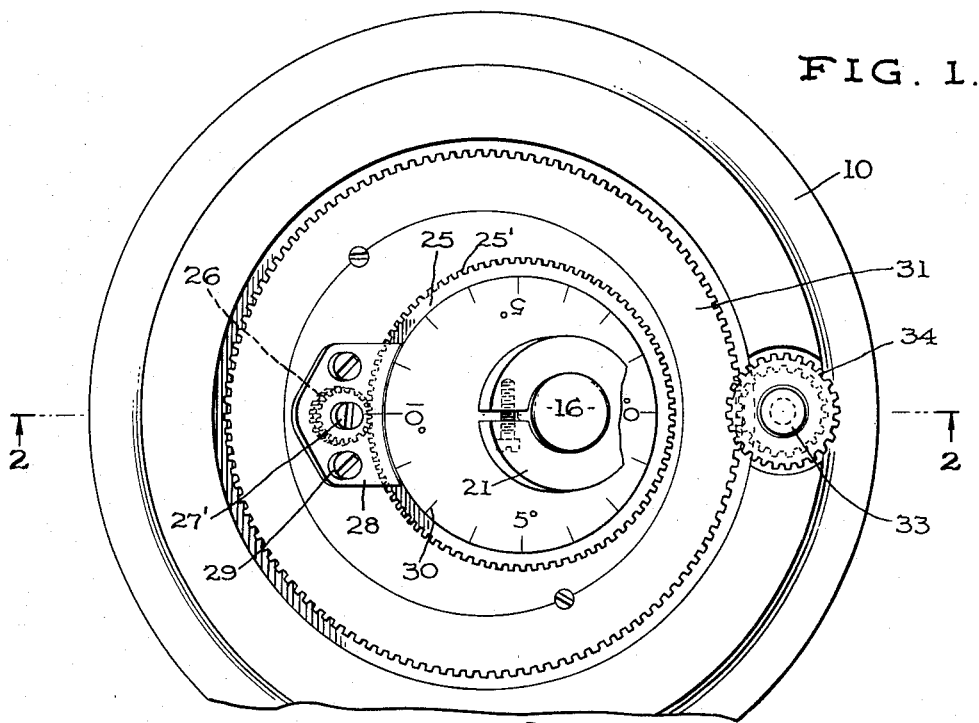
Figure 2:
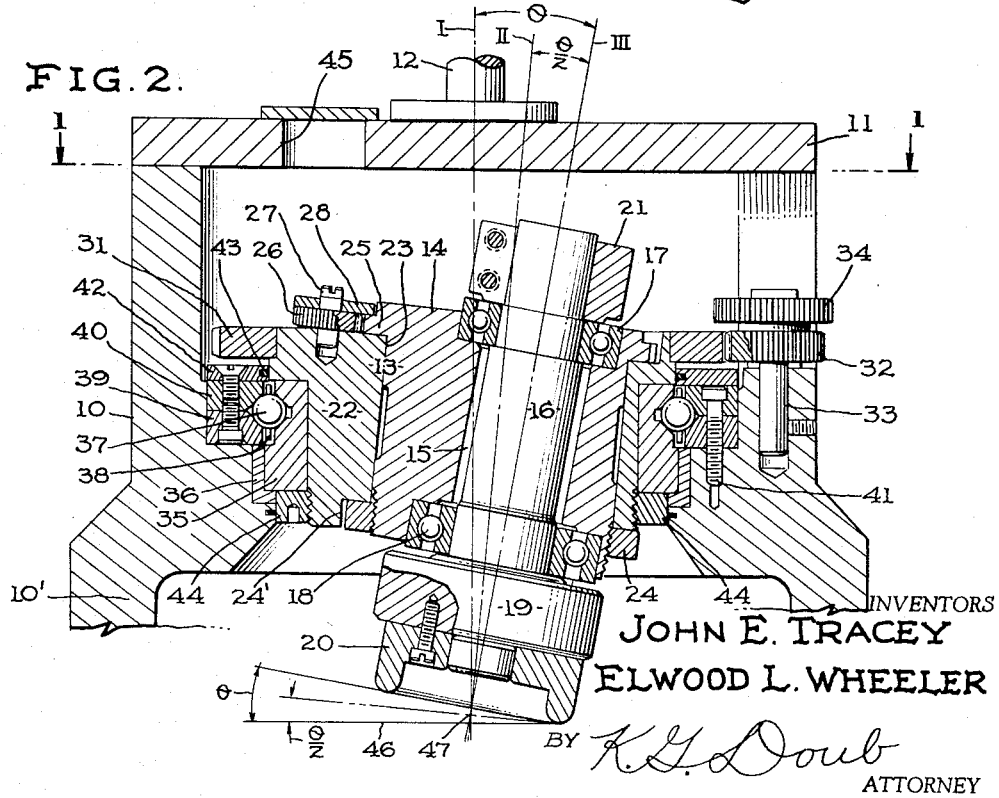

The foregoing and other objects and advantages will become apparent in the light of the following description taken in conjunction with the drawings, wherein:

Figure 1 is a top plan view of a machine tool fixture in accordance with the invention, taken on the line 1—1, Fig. 2; and Figure 2 is a transverse vertical section taken substantially on the line 2—2, Fig. 1.

Referring to the drawings in detail, the tool fixture or holder is supported by a carrying frame made up of a hollow cylindrical body 10 having a cover 11. A rod 12 projects from the top cover which in practice is connected to a power cylinder (not shown) for raising and lowering the fixture to and from operative position with respect to the work. At its lower end the cylindrical body 10 terminates in a skirt portion 10′, only part of which is shown.

The fixture proper comprises a wobble drive assembly including a gear body or block generally indicated at 13; it is made up of inner and outer sections 14 and 22. The inner section 14 consists of a cylindrical member having an annular bore 15 extending therethrough at a predetermined angle of inclination (indicated by line III, Fig. 2) with respect to the axis of rotation (indicated by the vertical line I) of the gear body 13. A tool-holder in the form of a shaft 16 is received in said bore and is provided with spaced upper and lower thrust bearings 17 and 18, which are preferably of the ball type to reduce friction to a minimum under load when the gear body section or block 14 rotates around said shaft. At its lower end the shaft 16 has secured thereto a head or chuck 19, which in the present instance has removably connected thereto an annular welding electrode 20, although other tools could be utilized, depending upon the type of work to be performed. At its upper end the shaft 16 has clamped thereon a split thrust collar or bushing 21, which backs up the bearing 17 and is adjustable to take up end play. This collar may be connected to the adjacent frame structure when operating on work which requires that the shaft 16 be positively held against rotation.

The outer gear body section 22 is formed with an annular bore 23 in which the inner gear body section 14 is received, and this bore 23 also extends at an angle of inclination (indicated by line II) with respect to the axis of rotation of the gear body 13, the angle of inclination of bore 15 being complementary to that of bore 23. These outer and inner gear body sections 22 and 14 are normally connected to one another for rotation in unison but the inner section is rotatable or angularly adjustable in the outer section to swing the shaft 16 in a cone-shaped semi-circle about the axis of rotation of the gear body 13, to preset the angular working position of the shaft 16 and tool carried thereby in a manner to be more fully described. At its lower end the outer body section 22 seats on an internally-threaded retainer ring 24, which is threaded on the lower end of the inner section 14. At its upper end the inner gear body section 14 is provided with an annular flange 25, which rests in part on the upper inner edge portion of the outer section 22 and in part on a complementary flange or radial offset formed on said latter section. The flange 25 constitutes in effect a ring gear since it has a toothed periphery 25′, in mesh with an adjusting pinion 26, secured on or formed integral with a stub shaft or pin 27, the latter at its lower end being journaled in a bore formed in the top portion of the section 22 and having a screwdriver slot 27′ in its upper or outer end to facilitate manual adjustment. A combined lock and marker plate 28 is secured by screws 29 on the top surface of the gear body section 22 and has a bore which receives the upper end of the pinion shaft 27, the inner arcuate edge of said plate being complementary to the upper peripheral edge portion of the inner gear body section 14, which has its top surface marked off in series of radial graduations 30, thus providing a built-in dial plate bearing indicia denoting in degrees the angularity of the shaft 16. When it is desired to lock the inner carrier section in adjusted position, screws 29 are tightened down to thereby firmly clamp the pinion 26 between the plate 28 and the adjacent top surface of the outer gear body section 22.

A ring gear 31 is fitted in a recess or relieved portion formed around the upper periphery of the outer gear body section 22; its teeth are in mesh with those of a drive pinion 32, secured on a vertical shaft 33, journaled in the housing 10. A drive gear 34 is also secured on shaft 33; and by means of these gears 31, 32 and 34 the wobble drive assembly, including the inner and outer gear body sections 14 and 22, is rotated as a unit about the axis I, thereby moving the shaft 16 in an inverted cone-shaped path, with the exact center of the cone located substantially at the point where the lines I, II and III converge.

The drive on gear 34 may be had by any suitable means, not shown, since it forms no part of the present invention.

To reduce the drive friction load to a minimum, the outer gear body section 22 has secured thereon a bearing race 35, preferably of hardened ball-bearing steel, which at its lower end has a running fit in a porous bronze bearing 36. At its upper end the bearing race 35 is provided with an annular ground and finished recess to receive ball bearings 37, there being a suitable number of the latter properly distributed around the race 35 and held in place by means of a bearing cage 38. An outer bearing race, made up of rings 39 and 40, is fitted around the balls 37, said rings being received in the housing 10 and secured by means of screws 41. By means of this particular type of bearing assembly, the radial thrust is distributed between the porous bronze bearing 36 and the ball bearings 37. This enables the ball bearings to take substantially the entire upward load thrust when the tool is operating on the work. This arrangement has also been found to be of considerable value when starting rotation under load, as where the electrode 20 or other tool has been lowered and is being forced against the work.

A cover plate 42 is secured to the bearing ring 40 and carries a felt wiper 43, which serves as a lubricant retaining seal. Another felt wiper is fitted directly into the housing 10 around bottom retainer ring 44 to seal the assembly at this point.

An opening 45 in cover 11 facilitates access to the clamp and marker plate screws 39, the adjusting pinion 26 and its screw-headed shaft 27.

Operation

In practice, the tool fixture of the instant invention has been used with marked success in the art of resistance welding, and this type of work will serve as an example in the following description of operation.

Let it be assumed that it is desired to first join by spot-welding two diaphragms which make up a pressure-sensitive aneroid of the dual-diaphragm type heretofore briefly described in connection with the Hughes et al. patent application, followed by a final peripheral seam-welding operation. To spot weld, shaft 16 is first set at zero inclination and the fixture lowered directly onto the work, the electrode 20 moving down in full or flush contact with the work, which would lie in a plane substantially normal to the axis of rotation I, said plane being indicated by the line 46, Fig. 2. The various electrical connections from the welding transformer are not shown; they may be readily understood by referring to the said copending application of William J. Hughes et al. After the pair of diaphragms have been thus securely connected to one another, the shaft 16 is tilted to some predetermined angle, and rotation of the inner and outer gear body sections or carriers 14 and 22 as a unit is had through the medium of the drive pinion 32 and ring gear 31. In the position of the parts as shown in the drawings, the working or operating angle of the shaft 16 is at a maximum; should it be adjusted through 180° in either a clockwise or counterclockwise direction about axis I, its angle of tilt and hence its cone-shaped path will gradually decrease until it extends perpendicular to the work surface 46.

To set the shaft 16 at a zero angle, the screws 29 are loosened and the adjusting pinion 26 rotated, as by means of a screwdriver, to in turn rotate the inner gear body section 14 either in a clockwise or counterclockwise direction within the outer gear body section 22. When the gear body section 14 is thus rotated it swings the shaft 16 about the axis II. If the section 14 is rotated through 180° from its position as shown in the drawings, the shaft 16 will gradually move upright with the working center of the electrode 20 remaining fixed at the point 47. When axis III coincides exactly with the axis I, the reading mark 0° on the dial-configured top of the section 14, see Fig. 1, will register with the center mark on the face plate 28. The peripheral contact edge of the electrode 20 will now lie in substantially the same plane as the line 46.

To set shaft 16 for the seam welding operation, the adjusting pinion 26 is now rotated to any selected point within 180° in either direction, to in turn rotate the inner gear body section 14 with respect to the outer gear body section 22, which will again swing the shaft axis III about the axis II, thereby tilting the said shaft and hence the electrode 20 at any predetermined angle within the limits of the ten-degree setting, the working center of the electrode still remaining fixed at point 47. If the drive is now applied to the wobble assembly and the welding current turned on, the electrode will "walk around" the work to perform the desired seam welding operation.

It will be noted that the line II is exactly midway between the zero setting axis, line I, and the predetermined maximum setting angle as denoted by line III.

Thus a remarkably convenient adjustment is provided for a tool holding and wobble drive assembly, which though normally of the conical or "walk around" type may be easily converted to an axial-alignment or full flush surface type. The graduations on the dial face of the inner carrier 14 may be "verniered" to facilitate a very precise or exact reading when setting the tool-holding shaft 16. In the device illustrated herein, rotation of the inner gear body section 14 through 180° within the outer section 22 will adjust the angle of inclination of shaft 16 from maximum to zero. In other words, rotation of section 14 through ten degrees will vary the angle of inclination of shaft 16 one degree, thus providing a ratio of 18 to 1. However, any other adjustment ratio may be adopted to meet varying specifications. In certain instances it may be found feasible to connect the work piece to the chuck or holder 19 and actuate the work relatively to a fixed tool. For example, in diaphragm welding the fixture could be inverted, in which event the lower electrode would function as the movable electrode and the upper electrode would remain fixed. This would constitute a reversal of the arrangement of the welding machine of the copending Hughes et al. application heretofore noted.

What is claimed is:

1. In a machine tool fixture, a supporting frame adapted to be moved toward and from the work undergoing fabrication, a bearing assembly seated in said frame and provided with an annular bearing race member, a wobble drive assembly comprising a gear body made up of outer and inner telescoping sections, the outer section having its periphery contoured to seat on and partly telescope in said bearing race member and said inner section being seated in a bore formed in the outer section at an angle inclined to the axis of rotation of the gear body, said inner section being also formed with a bore extending at an angle to the axis of rotation of the gear body, the angle of inclination of the bore of the inner section being complementary to that of the bore of the outer section, an electrode-holder journaled against longitudinal displacement in the bore of the inner section and projecting from one end thereof, an annular electrode secured on the projecting end of said holder, the axial working center of said electrode lying on the axis of rotation of the gear body at the point of intersection therewith of lines projected from the axes of the bores of said outer and inner sections, and calibrated electrode resetting means connecting the outer and inner gear body sections to one another for rotation as a unit, said latter means including an adjusting member releasable to angularly reset the inner section relatively to the outer section.

2. A machine tool fixture as claimed in claim 1 wherein said calibrated electrode resetting means comprises a radial flange on the inner gear body section which in part seats on the adjacent end surface of the outer section and in part in a complementary semicircular recess formed in said surface, said flange being formed as a calibrated ring gear and said adjusting member consists of a pinion gear journaled in the outer section in mesh with the teeth of said ring gear, and releasable means are provided for securing the pinion against rotation following a resetting operation.

References Cited in the file of this patent

UNITED STATES PATENTS

| | | |
|---|---|---|
| 1,196,852 | Fulda | Sept. 5, 1916 |
| 2,474,129 | Tramontini | June 21, 1949 |
| 2,773,968 | Martellotti et al. | Dec. 11, 1956 |